Patented Jan. 16, 1945

2,367,546

UNITED STATES PATENT OFFICE

2,367,546
CYCLOHEXENYL ALKYLAMINES

Glenn E. Ullyot, Philadelphia, Pa., assignor to Smith, Kline & French Laboratories, Philadelphia, Pa., a corporation of Pennsylvania No Drawing. Application January 27, 1942, Serial No. 428,376

7 Claims. (Cl. 260—563)

This invention relates to new cyclohexenyl alkylamines and their salts.

From the broad standpoint, the new compounds contemplated by this invention comprise essentially β-cyclohexenyl alkylamines, including their optically active isomers, and organic and inorganic salts thereof, as indicated by the following general formula:

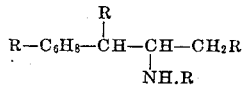

where R is a member of the group consisting of hydrogen and a methyl radical.

The amine bases in accordance with this invention will have various uses therapeutically for treatment of various conditions of the human and animal system, as will also the non-toxic organic and inorganic salts thereof, produced with organic and inorganic acids yielding non-toxic ions, as for example, hydrochlorides, sulfates, carbonates, tartrates, gluconates, etc.

Examples of such bases and their salts are:

(a) β-Cyclohexenyl isopropylamine sulfate
(b) β-Cyclohexenyl isopropylmethylamine hydrobromide
(c) β-(4-methyl cyclohexenyl) isopropylamine lactate
(d) 1-Cyclohexenyl, 2-amino butane acetate More particularly, the new compounds, in accordance with this invention, in various forms will be found to be advantageous for producing effects simulating stimulation of neuro-muscular mechanisms under the control of the sympathetic nervous system, more particularly contraction or relaxation of smooth muscle, depending upon the function of the sympathetic nervous system, vasoconstriction, etc.; and for producing general and local effects resultant from stimulation of the sympathetic system. In general, the effects produced adapt them for the treatment of any condition where general or local effects resultant from stimulating the sympathetic system are therapeutically effective and desirable.

From the therapeutic standpoint, the new compounds in accordance with this invention may be employed in various forms. Due to the relatively small quantities of the active ingredient required in therapeutic use, it is usually desirable to provide an extender by admixture with various types of excipients. Thus, for example, the soluble non-toxic mineral acid salts will lend themselves to extension in water, as in aqueous solution; and the salts of the higher fatty acids will be variously soluble in vegetable or mineral oils. Suitable non-toxic salts will also lend themselves to extension with therapeutically inert solid excipients for incorporation into tablet form. The bases and salts thereof, volatile by virtue of dissociation, for example, the carbonates, may be locally applied in vapor form extended with air, as by inhalation. These various forms may be variously administered to the human or animal body, for example, locally to the skin or muscosal membranes, by mouth or parenterally by intravenous, subcutaneous, or intramuscular injection.

The β-cyclohexenyl alkylamines, including their optically active isomers, and the salts thereof, comprising essentially the physiologically active ingredients of various medicinal agents, may be prepared by procedures familiar to those skilled in the art. No claim to any particular method of preparation is made.

By way of example, the primary amine bases may conveniently be obtained by first preparing the cyclohexenyl ketone corresponding to the desired amine. Such ketones, where not already commercially available, may be prepared by one of the following standard methods:

(1) The condensation of an aliphatic ketone, such as acetone or methyl ethyl ketone, with cyclohexanone or methyl cyclohexanone.

(2) The dry distillation of the mixed alkaline earth salts of the appropriate acids, as of a mixture of the calcium salt of cyclohexenyl acetic acid and calcium acetate.

(3) The controlled addition of the appropriate Grignard reagent to a cyclohexenyl alkylcyanide or aliphatic amide, as the interaction of cyclohexenyl acetonitrile and methyl magnesium iodide.

One mol of ketone is reacted with an excess of formamide, followed by hydrolysis of the resulting formyl derivative, liberation of the amine by the addition of excess alkali and recovery and purification by well-known procedures.

The corresponding secondary isopropylamine bases may be prepared by the same synthesis disclosed supra for the preparation of primary amines, except that N-methyl formamide is substituted for formamide.

The salts variously of the amines contemplated by this invention may be readily prepared from the bases by exact neutralization with an acid corresponding to the desired salt. It will be found that certain salts do not lend themselves to isolation in crystalline form, while others may be readily crystallized from a suitable solvent.

The amine bases are produced by the methods outlined in the form of a racemic mixture. The optically active isomers may be separated from the mixture if desired by crystallization of the salt of the amine base with an optically active acid, as d- or l-tartaric acid.

By way of illustrating the preparation of various representative members of this group of compounds within the scope of this invention, the following examples are detailed:

EXAMPLE 1

β-Cyclohexenylisopropylamine

Twenty-five grams of cyclohexenyl acetone, a compound known to the art, dissolved in 9 grams of 85% formic acid, is caused to interact with 39.5 grams of formamide at 160–180° C. for four hours. This results in the formation of the formyl derivative of the amine, according to the following reaction:

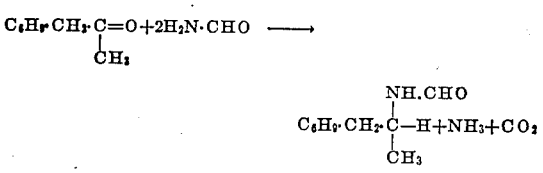

The formyl derivative is then hydrolyzed by refluxing with 50% sulfuric acid for about four hours, after which the hydrolysate is extracted with ether to remove the acid-insoluble material and the aqueous solution made strongly alkaline with any suitable alkalizing agent, for example, sodium hydroxide, to liberate the amine.

The amine is then taken up in ether, dried over potassium hydroxide and purified by distillation, preferably under reduced pressure. β-Cyclohexenyl isopropylamine thus obtained boils at 109–114° C. at 55 mm. Hg.

EXAMPLE 2

β-(p-Methylcyclohexenyl)-isopropylamine

The preparation of this compound is effected by following the directions under Example 1, substituting equal molar proportions of p-methylcyclohexenyl acetone, a compound known to the art, for cyclohexenyl acetone. β-(p-Methylcyclohexenyl)-isopropylamine boils at 208–210° C. at atmospheric pressure.

EXAMPLE 3

β-Cyclohexenylisopropylmethylamine

This compound may be readily prepared by the synthesis described in Example 1, substituting N-methyl formamide for formamide. It boils at 208–210° C. atmospheric pressure.

EXAMPLE 4

1-cyclohexenyl-2-aminobutane

This compound may be prepared by first synthesizing cyclohexenylmethylethylketone, a compound new to the art.

784 g. (8 mols) of cyclohexanone were added to 1152 g. (16 mols) of methylethyl ketone. The mixture was cooled to 5° C. and 146 g. (4 mols) of hydrogen chloride gas were passed in. The reaction product was allowed to stand for 12 hours and then was washed with water to remove the hydrochloric acid. After drying over anhydrous sodium carbonate, the mixture was fractionated. The desired ketone was collected at 92–94° C./6–7 mm.

1-cyclohexenyl-2-aminobutane may be prepared from cyclohexenylmethylethylketone by the formamide process, as described in Example #1. It boils at 80–84° C. at 7 mm. Hg.

In using the broad and specified embodiments of this invention for therapeutic effect, the physical form of the preparation will depend on various factors. Thus, for example, for application to the rhinological tract, the volatile bases may be suitably supported in an inhaler tube and applied in vapor form, or a suitable salt selected from the compounds disclosed above may be dissolved in a light vegetable or mineral oil or in an aqueous or a saline solution and applied by tampon, dropper or spray. If desired, ointments may be prepared for application to the skin by extending suitable salts of the compounds contemplated by this invention with any suitable ointment base. For oral administration, a tablet composed of a suitable non-toxic salt of a suitable base selected from the group of compounds within the scope of this invention, extended by lactose, starch, gelatin and/or talc, will be found suitable; however, aqueous and/or alcoholic elixirs will also be found advantageous for administration by this route. A suitable form for parenteral injection will desirably be an aqueous, saline, light oil or gelatin solution of a suitable non-toxic salt.

Medicinal preparations containing as the active ingredient variously the compounds described ante will be found to have various physiological effects. For example, when suitably applied to the nose, shrinkage of the nasal mucosa is produced, adapting them for the relief of nasal congestion in connection with the common cold, sinusitis, hay fever and other rhinological conditions. When introduced locally into the conjunctival sac, they produce mydriasis, an effect useful in many ophthalmic and other therapeutic proceures. When administered orally or parenterally, these preparations produce general effects simulating stimulation of the sympathetic nervous system, including a rise in blood pressure and smooth muscle effect, thus adapting them for the treatment of conditions where systemic sympathomimetic effects are desirable.

The relative amounts of the compounds comprising the active ingredients of the medicinal preparations, as well as the kind and proportion of excipients and extenders used, are subject to wide variation according to the quantitative or qualitative physiologic effects to be attained, the method of administration and the relative potency of the specific composition selected. Thus, the specific dose must necessarily depend upon the particular compound used and the effect to be obtained.

However, by way of illustrating examples of suitable pharmaceutical preparations containing as active therapeutic ingredients the compounds in accordance with this invention, descriptions of some medicinal products are herewith detailed. It is my specific intent, however, that the invention shall not be limited to such.

Oil solutions for topical application to nasal membranes can be prepared by dissolving 1.0 gram of β-cyclohexenyl isopropylamine base and 2.0 grams of oleic acid in 100 cc. of low viscosity liquid petrolatum and adding a suitable amount of any desired flavoring agent.

Sterile ampule vials, containing 10 mg. of the sulfate salt of any of the compounds contemplated by this invention, with 8 mg. of pure sodium chloride and 1 cc. of water can be prepared for use as a preparation for parenteral injections.

Elixirs for oral administration can be prepared by dissolving 5 grams of a suitable salt in 100 cc. water and adding 125 cc. of ethanol, 10 cc. lemon flavoring concentrate and 765 cc. of 60% simple sucrose syrup and coloring with a certified dyestuff.

Tablets for oral administration can be prepared by mixing 10 grams of the sulfate salt of any of the compounds contemplated by this invention with 210 grams of milk sugar and granulating this mixture with 5 grams of acacia in solution form. When this mixture is dried, force through a 16 mesh sieve and thoroughly mix with 15 grams of starch, 8 grams of talc and 2 grams of stearic acid. This granulation can be compressed into 10,000 tablets of 25 mg. each.

This application is a continuation-in-part of the joint application of Glenn E. Ullyot and George H. Connitt, filed February 10, 1941, Serial No. 378,244, with respect to the subject-matter of which Glenn E. Ullyot is the sole inventor.

What I claim and desire to protect by Letters Patent is:

1. A compound selected from the group consisting of β-cyclohexenyl alklyamines having the following general formula:

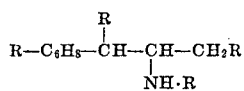

where R is a member of the group consisting of hydrogen and a methyl radical; and salts thereof.

2. A compound selected from the group consisting of β-cyclohexenyl alkylamines having the following general formula:

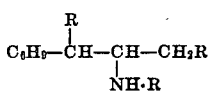

where R is a member of the group consisting of hydrogen and a methyl radical; and salts thereof.

3. A compound selected from the group consisting of β-cyclohexenyl alkylamines having the following general formula:

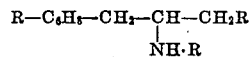

where R is a member of the group consisting of hydrogen and a methyl radical; and salts thereof.

4. A compound selected from the group consisting of β-cyclohexenyl alkylamines having the following general formula:

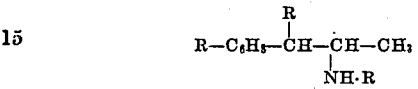

where R is a member of the group consisting of hydrogen and a methyl radical; and salts thereof.

5. A compound selected from the group consisting of β-cyclohexenyl isopropylamine of the formula

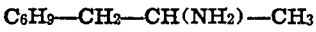

and salts thereof.

6. A compound selected from the group consisting of β-cyclohexenyl isopropylmethylamine of the formula

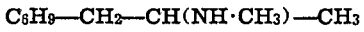

and salts thereof.

7. A compound selected from the group consisting of β-(4-methylcyclohexenyl) isopropylamine of the formula

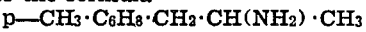

and salts thereof.

GLENN E. ULLYOT.